March 10, 1970   J. H. MEIER   3,500,301
SONIC DETECTION APPARATUS
Filed Oct. 23, 1967   2 Sheets-Sheet 1

INVENTOR
JOHANN H. MEIER
BY H. P. Johnson
ATTORNEY

United States Patent Office 3,500,301
Patented Mar. 10, 1970

3,500,301
SONIC DETECTION APPARATUS
Johann H. Meier, Vestal, N.Y., assignor to International Business Machines Corporation, Armonk, N.Y., a corporation of New York
Filed Oct. 23, 1967, Ser. No. 677,156
Int. Cl. G01s 9/66
U.S. Cl. 340—1                                      5 Claims

ABSTRACT OF THE DISCLOSURE

Apparatus for detecting changes in surface position in which sonic sensing and reference signals are directed respectively at a pathway for a reflective surface and a pathway without a reflective surface. Signals reflected from the pathway alone are used to counter the pathway structure where the surface is located so that only surface reflective signals result. These signals are then phase-compared with standard reference signals to indicate any change in location of the reflective surface relative to the standard reference.

BACKGROUND OF THE INVENTION

Sonic detection devices have often been employed to sense the presence of objects in a pathway or of intruders within a predetermined area. The devices operate by responding to a change in the usual sound wave pattern within the area which indicates that a disturbance has been created. Such devices are particularly useful in applications for detecting object motion and direction.

The prior art devices are not well adapted to reliably indicate minute changes in the distance of objects which are slowly moving, move incrementally or move with varying speed. These devices compare the relative magnitude or phase of successive sonic signals reflected from the detected object, and the detection apparatus must be sufficiently sensitive so that minute differences in the two successive signals can be detected. A problem with this arrangement is that variations in surface reflectivity, transmission medium or temperature can easily effect the reflected signals sufficiently to produce erroneous indications at the detection apparatus. Although not a serious problem, there are occasions when the usual arrangement indicates null points because of velocity or incremental motion coincident with the transmission frequency of the sonic signals.

Accordingly it is a primary object of this invention to provide sonic detection apparatus that determines the relative position of a reflective surface independently of the magnitude of reflected signals.

Another object of this invention is to provide detection apparatus having improved capability of measuring small changes in the positon of sonically reflective surfaces.

A further object of this invention is to provide sonic detection apparatus which can indicate a change in position of a reflective surface which, over a wide range, is independent of the speed of movement of the surface.

Yet another object of this invention is to provide sonic apparatus that can be readily adapted to establish the thickness of an object and indicate whether or not the thickness is within prescribed limits.

SUMMARY OF THE INVENTION

The foregoing objects are attained with the present invention by providing means for transmitting first and second sonic signals and respective receiving means for the two pluralities of signals. Each receiving means in turn produces corresponding electrical output signals from the received sonic signals. The first receiving means is positioned to respond to sensing signals reflected from the surface of the object of concern. The second receiving means can respond to either directly transmitted sonic reference signals or those reflected from a stationary object. Comparing means are provided that are responsive to the resulting generated electrical signals for determining the time intervals between the occurrence of corresponding first and second electrical output signals.

The transmitted signals, preferably in the ultrasonic range, are derived from the same oscillator, hence they are in phase. The phase of the received sonic signals, however, depends on the length of the respective paths for the sound waves. The difference in phase between the corresponding first and second electrical signals is thus a measure of the difference in length of the respective paths taken by two corresponding sonic signals upon transmission. By directing sensing signals to a movable first surface and appropriately adjusting the phase of the second signals, reflected from a stationary second surface, a known relation between the lengths of the paths is established. Any future change in the established phase relation then indicates the change in length of the first path. By expressing the phase relation in an easily measurable form, such as voltage, the change in path length can readily be indicated.

This arrangement of detection apparatus for surface position does not rely on the variation in magnitude of reflected signals; the reflected signals need only be capable of detection by the receiving means. By using adjustable delaying means for the path of the reference signals, the range of path length to be measured can easily be shifted to suit the particular situation. In other words, the zero position of the apparatus can be varied. Although the range of position of the surface to be monitored according to the invention is limited to approximately one-half wave length of the sonic signal at the transmitting frequency, the resolution within that range of distance is within a few percent of the wave length.

The invention is well adapted to monitor the change in thickness of objects such as webs having reflective surfaces, such as metal or paper, by using opposing sets of transmission and receiving apparatus on opposite sides of the web to detect any change in position of either or both surfaces, and then establishing the difference between such changes.

The foregoing and other objects, features and advantages of the invention will be apparent from the following more particular description of preferred embodiments of the invention as illustrated in the accompanying drawings.

BRIEF DESCRIPTION OF THE DRAWINGS

Referring to FIG. 1, a web 10 is directed along a predetermined path between guides 11, 12 in the direction of the arrow. Web 10 may be of various materials, such as metal, glass, paper, plastic or the like, having an upper surface which reflects sound wave energy. Positioned above upper guide 11 is a pair of commercially available sonic transducers 14, 15, such as the crystal type. Transducer 14 is a sending transducer, so designated by an "S," driven by oscillator 16 so that sonic signals are transmitted through aperture 17 in upper guide 11 to web 10. Sound waves striking the web are reflected upwardly and strike receiving transducer 15 designated by an "R."

Figure 1:
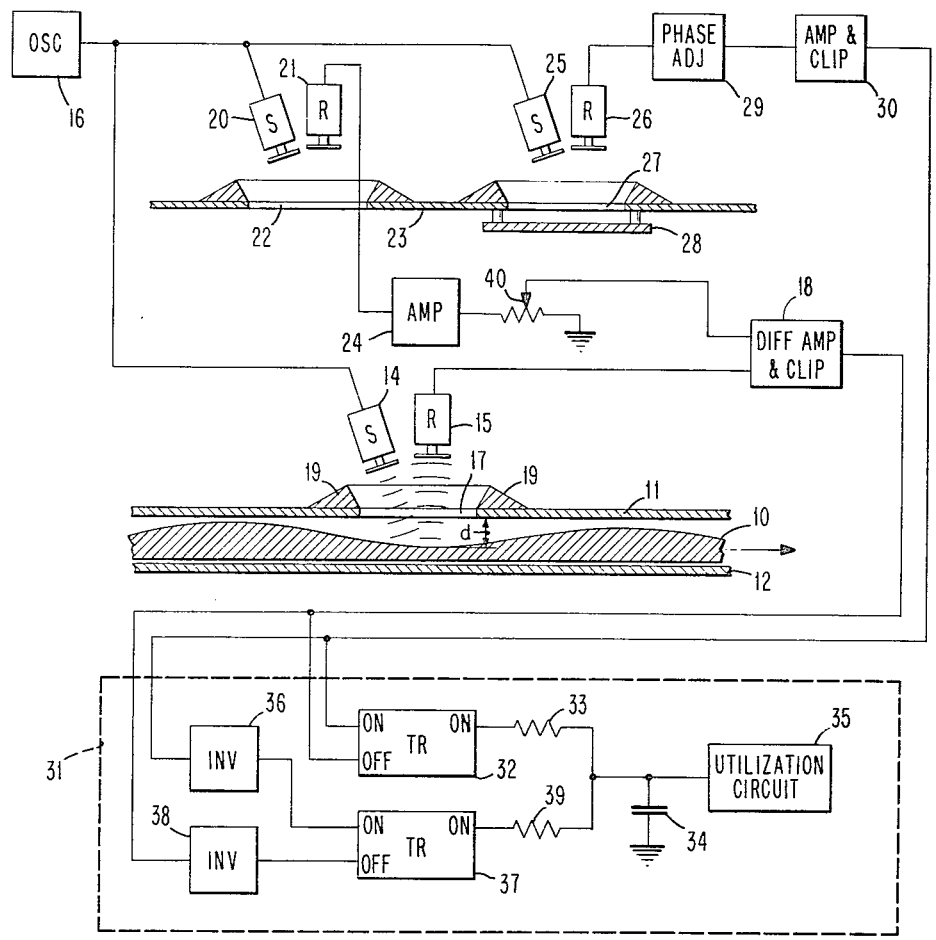
FIG. 1 is a schematic block diagram of a sonic detection system arranged in accordance with the present invention.

Transducer 15 produces an electrical output signal for each sonic signal it receives and this signal is applied as one of two inputs to differential amplifier 18.

In the arrangement of the sending and receiving transducers just described, there are reflections of sonic signals from guide 11. Without further precaution, only a fraction of the sound energy reaching receiver 15 would be reflected from the web; the remainder would be reflected from the guide. The resulting compound signal would change phase substantially less than the component reflected from the web alone. Furthermore, the energy component reflected from the web decreases in magnitude with an increasing guide-to-web distance, whereas the component reflected from the guide is of constant magnitude. A non-linearity would thus be introduced. Therefore, triangular baffles 19 are provided to minimize the amount of sound energy reflected from the guide into the receiving transducer. The baffles reduce, but do not eliminate entirely, the residual incidental signal reflections, so that a set of dummy transducers is preferably used to cancel out the remaining incidental reflections.

The dummy set of transducers includes sending transducer 20 and receiving transducer 21, which are spaced from guide 23 the same distances as transducers 14 and 15, respectively, are spaced from guide 11. Guide 23 is provided with an aperture 22, which is left open to simulate an infinite transmission distance for the signals emanating from sending transducer 20 so that the reflections received by transducer 21 are only those reflected from guide 23. Sending transducer 20 is also driven by oscillator 16 and the transmitted signals are in phase with those emanating from sending transducer 14. The output of transducer 15 represents the reflective effects of the surface 10 and of guide 11, and the output of transducer 21 represents the reflective effect of guide 23. Since the geometry of the two guides is the same, the difference in output of transducers 15 and 21 represents the effect of the reflective surface 10 alone. The output of transducer 21 is, therefore, used as the second input of differential amplifier 18 so that theoutput of differential amplifier 18 represents the effect of the reflective surface alone. In order to account for differences in transducer efficiency of the pairs 14 15 and 20–21, the signal of transducer 21 is first amplified (without phase shift) in amplifier 24 and subsequently attenuated to the proper level by potentiometer 40. Amplifier 24 is of the low output-impedance type, so that several potentiometers 40, 41 (see FIG. 2) can be connected to it without causing crosstalk between the potentiometers. Potentiometer 40 is adjusted for minimum output of differential amplifier 18 when web 10 is removed. Then, as the reflective surface of web 10 is brought into play, the signal from differential amplifier 18 is substantially produced by the portion of the sonic energy traveling from sending transducer 14 to the web 10 and thence to receiving transducer 15, with the noise due to incidental reflections from guide 11 being substantially eliminated by the dummy set of transducers 20 and 21. A clipping circuit is included with differential amplifier 18 to clip the output signals and to produce essentially square waves.

In order to eliminate the tendency of standing sonic waves to lock in and produce a nonlinear relationship between guide-to-document distance and a phase change at the receiver, the transducers are deliberately arranged so that they form unequal angles with the web plane. This prevents the sound waves from bouncing back and forth and renders the formation of standing waves less likely.

Changes in the path distance from sending transducer 14 to web 10 and then to receiving transducer 15 are detected by comparing the phase of the reflected sonic signals from the unknown path length with a source of sonic reference signals which are representative of a known path length. The sonic reference signals are generated by transducers 25, 26. Simulated web guide 23 is provided with an aperture 27 below which is fixed a sonically reflective plate 28. The plate and aperture are arranged similar to that of guide 11 and web 10 for sensing transducers 14, 15. The sonic path distance from sending transducer 25 to plate 28 and back to receiving transducer 26, however, is made slightly less than the minimum sonic path distance expected to be encountered with transducers 14, 15. Sending transducer 25 is also driven by oscillator 16 in common with sending transducers 14 and 20 so that the signals issuing from all sending transducers are in phase. The sonic signals received by transducer 26 are supplied to an adjustable phase-control circuit 29 for initial zero adjustment, and thence to an amplifying and clipping circuit 30.

Although the reference signals could be produced by merely delaying electrical oscillator signals, it is preferable to use electro-sonic transducers because of the built-in temperature compensation available. The transducers are particularly sensitive to temperature changes and, by mounting all transducers in a similar environment, compensation and reliability are more readily achieved. Furthermore, in this case, the velocity of sound propagation through the air, which depends on temperature, is substantially the same for all three pairs of transducers and the net effect on position indication is very small. It should be noted that the adjustable phase-control circuit 29 may be replaced by a mechanical position adjustment of plate 28.

The length of the sonic path for signals from transducer 14 to transducer 15 is determined by applying the electrical signals from both amplifiers 18 and 30 to an analog conversion circuit 31. A reference signal from amplifier 30, resulting from a sonic path shorter than that of the sensing transducers, occurs first in time relative to its corresponding compensated sensing signal from differential amplifier 18. The rise of reference signal from amplifier 30 is made to turn on bistable trigger 32. Some time later, because of the longer path length, the rise of the corresponding sensing signal appears from differential amplifier 18 to turn off the bistable trigger. While the trigger is on, a voltage is supplied across an RC integrating network consisting of resistor 33 and capacitor 34. When the trigger is off, the charge on capacitor 34 bleeds off through resistor 33 and the output stage of bistable trigger 32. The time-averaged trigger output is supplied to a utilization device 35 such as a threshold circuit. The threshold circuit may be set to actuate an indicating device or alarm when the time-averaged output voltage from the integrating circuit exceeds some preset value.

The voltage across capacitor 34 is a function of the length of time trigger 32 is on, which, in turn, represents the difference in phase between the signals from receiving transducers 26 and 15 due to the difference in lengths of the sonic paths. If the forward and backward D.C. output resistances of trigger 32 are made equal, this function becomes linear. The time constant of the RC network 33, 34 should equal at least ten periods of the oscillator 16 in order to keep down the ripple voltage on capacitor 34. The frequency response of this system is governed by the time constant of RC network 33, 34 and is limited, therefore, to somewhat less than 10% of the frequency of oscillator 16.

The effect of environmental sonic noise, when present, can be reduced by adding a parallel detection channel. In this channel both the reference and sensing signals are inverted. The output from amplifier 30 is applied to inverter 36 so that as the reference signal falls, trigger 37 is turned on. When the signal from amplifier 18 subsequently falls, the inversion at inverter 38 turns off trigger 37. The trigger output is integrated across resistor 39 and common capacitor 34. By using a common capacitor for the direct and inverted systems, the ripple frequency becomes twice the oscillator frequency and ripple voltage is correspondingly reduced. Accordingly, for a specified maximum ripple voltage, the addition of the parallel detection channel also permits doubling the frequency response of the system.

In operation, oscillator 16 drives all sending transducers in phase so that sonic signals are transmitted from transducers 14, 20 and 25 toward web 10, aperture 22 and plate 28, respectively. Oscillator 16 is preferably chosen to operate the transducers near their resonant frequency. The transducers are very sensitive near resonance because of their low internal damping, if of the crystal type. Operation exactly at resonances is to be avoided because of the very rapid change in phase between electrical input and sonic output (and vice versa) that occurs near resonance in devices with low damping. Therefore the transducers may be operated, for example, from one to several percent off the resonant frequency.

The sonic path length between sender, web and receiver should be at least four wave lengths, lest nonlinearities due to sonic near-field effects become too severe. Thus, with the velocity of sound in air at 13,200 inches per second at 80° F., the wave length at 40 kilocycles is 0.33 inch; the minimum desirable total path length would then be 1.32 inches. Since the wave length is 0.33 inch at a frequency of 40 kc., the range of uniquely detectable variation in position of the web surface would be approximately one-half this wave length or 0.165 inch.

The detection apparatus is calibrated by adjusting the delay of signals generated by reference transducer 26 at phase adjusting circuit 29 to represent some reference distance slightly less than the minimum sonic path length expected between transducers 14 and 15. Each sensing signal produced from differential amplifier 18 will then occur subsequent to its corresponding reference signal by an amount equal to the difference in total sonic path length as the reflective upper surface of web 10 varies in position. The position of the reflective surface can vary up to nearly one-half the wave length and trigger 32 will thus be turned on a corresponding time period to alter the voltage output to utilization circuit 35. The output voltage will be a substantially linear function of the sonic path length at the sensing transducers 14, 15 as the web surface changes position over range $d$ in FIG. 1.

Figure 2:
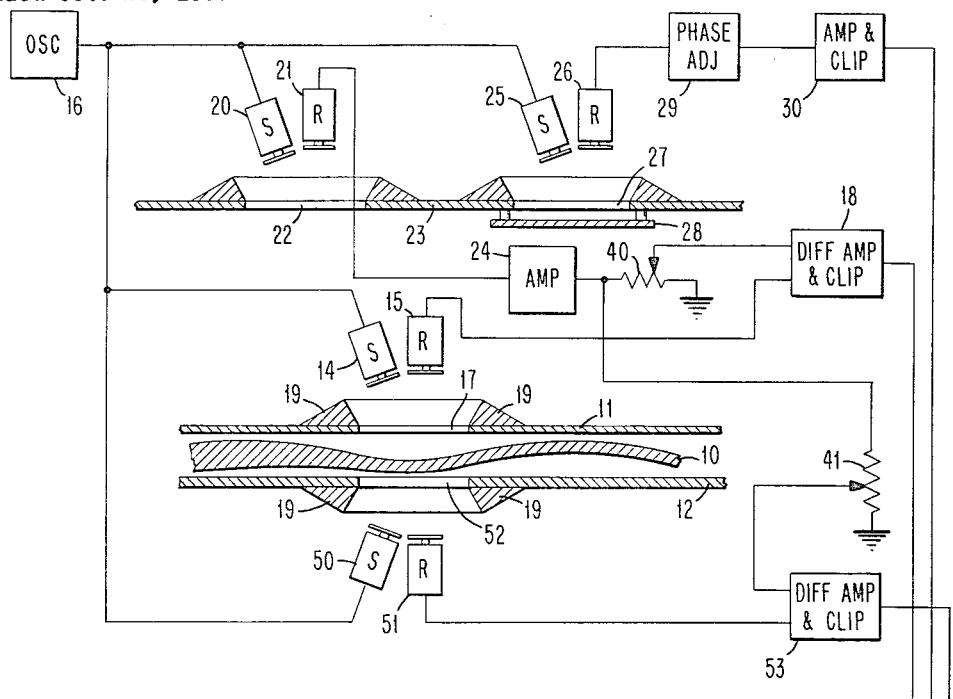
FIG. 2 is a schematic block diagram of another embodiment of the invention shown in FIG. 1 utilizing opposing sensing devices.
Figure 2:
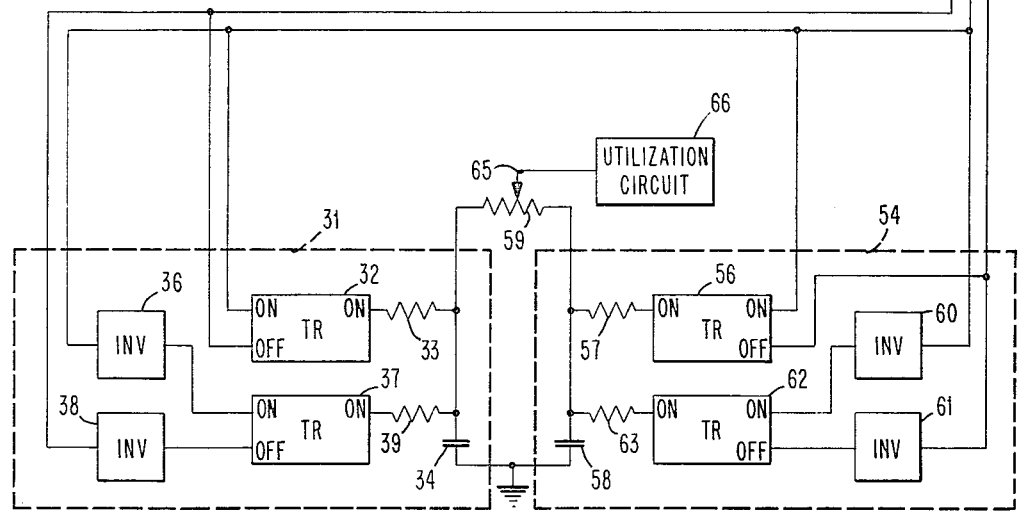

FIGURE 2 shows a modification of the apparatus in FIG. 1 in which a second set of sensing transducers 50, 51 has been added at an aperture 52 with baffles 19 in lower guide 12. This arrangement permits monitoring of web thickness by detecting variations in position of both the upper and lower surfaces concurrently. Elements of FIG. 2, which are identical to those shown in FIG. 1, are identified with the same reference numerals.

Transducer 50 is driven by common oscillator 16 and sonic signals emanating therefrom strike the lower surface of web 10 and are reflected to receiving transducer 51, which provides an electrical output signal representative of each reflected signal received. The output signal from transducer 51 is supplied as one input to differential amplifier and clipping circuit 53. The second input to the differential amplifier is from amplifier 24 and potentiometer 41, the output signal of which represents a signal from compensating receiving transducer 21.

The output signal from differential amplifier 53 is supplied to analog conversion circuit 54 similar to circuit 31 of FIG. 1. Reference signals from amplifier 30 are applied to turn on bistable trigger 56 and sensing signals from differential amplifier 53 are used to turn off the trigger. The trigger output is integrated across resistor 57 and capacitor 58 to provide an analog indication of the sonic path length between sending transducer 50 and receiving transducer 51. A potentiometer 59 having output tap 65 is connected between the output integrating circuits for transducers 50, 51 and transducers 14, 15. The tap is connected to utilization circuit 66, such as a threshold circuit.

As described above with relation to FIG. 1, environmental noise in the lower set of sensing and receiving transducers can be greatly reduced by including a parallel detection channel incorporating inverters 60, 61 and trigger 62 with the trigger output being integrated across resistor 63 and capacitor 58.

In the operation of FIG. 2, all sensing transducers are driven in phase by oscillator 16. Sensing transducers 14 and 50 each direct sonic signals against opposite surfaces of web 10 so that respective receiving transducers 15 and 51 respond to the reflected signals. Signals from the sensing transducers 15, 51 are applied to respective differential amplifiers 18 and 53. The signals from differential amplifier 18 are used in conjunction with the reference signals at analog conversion circuit 31 to operate trigger 32, while the signals from differential amplifier 53 and the reference signals are used at conversion circuit 54 to operate trigger 56. The analog output signal is taken from tap 65 positioned near the center of potentiometer 59.

In the case where web 10 is of constant thickness the output voltage at tap 65 will remain relatively constant even though the web changes position between the guides. As the sonic path for one set of sensing transducers shortens, the opposite path lengthens so that the integrated voltages at capacitors 34 and 58 counteract each other to maintain a constant output at tap 65. However, when the web thickness becomes either thinner or thicker, the opposite sonic paths both lengthen or shorten simultaneously so that a voltage change will be detected at tap 65. The tap may be appropriately adjusted near its midposition to account for slight differences in voltages sensitivity of the detection systems associated with transducers 14–15 and 50–51.

In the configuration of FIG. 2, the compensating signal from transducer 21 is used at both differential amplifiers, but if the configuration at lower guide 12 differs substantially from the physical environment of transducers 20, 21, a second corresponding set of compensation transducers is recommended. This will more accurately simulate the sonic reflection from guide 12.

Considering an operating frequency of 40 kilocycles at 80° F., the opposite sensing paths can each vary 0.165 inch. Therefore the web may shift its position by that amount or the thickness of the web may vary by that amount for detection by the apparatus described. By choosing higher or lower frequencies for the transmitted sonic signals, the sensitivity of the detection apparatus can be easily tailored to suit the requirements of the particular application. The sensing arrangement permits continuous monitoring of the change in position of a sonically reflective surface and can permit detection of changes on the order of a few percent of the sonic wave length.

While the invention has been particularly shown and described with reference to preferred embodiments thereof, it will be understood by those skilled in the art that various changes in form and detail may be made therein without departing from the spirit and scope of the invention.

What is claimed is:

1. Apparatus for detecting a change in the relative position of a pair of sonically reflective surfaces comprising:
   means defining a pathway along which said pair of reflective surfaces are coincidentally moved;
   a pair of means fixed on opposite sides of said pathway for simultaneously transmitting first sonic sensing signals toward one of said reflective surfaces, and second sonic sensing signals toward the other of said reflective surfaces;
   receiving means for each said transmitting means positioned relative to said reflective surfaces for generating respective first and second output signals in response to reflections of said sonic sensing signals;
   means for generating a corresponding reference signal having a predetermined time relation with each said transmitted sonic signal and being representative of a sonic path of constant length; and comparing means responsive to said first and second output signals and said reference signals for determining the time intervals between said reference signal and said first output signal, and between said reference signal and said second output signal to represent the relative lengths of the transmission paths of said first and second sonic sensing signals.

2. Apparatus as described in claim 1 further including means responsive to said time intervals for indicating when the sum of the lengths of said paths differs by a specified amount from a predetermined limit.

3. Apparatus as described in claim 1 wherein said generating means includes means for transmitting reference sonic signals against a sonically reflective surface in synchronism with said sensing signals, and reference receiving means for generating a reference output signal in response to each said reflected reference signal.

4. Apparatus as described in claim 1 wherein said comparing means includes means responsive to the leading edges of corresponding reference and first and second output signals for providing first phase-difference signals, means responsive to the trailing edges of corresponding reference and first and second output signals for providing second phase-difference signals, and means for time-averaging said first and second phase-difference signals over a plurality of corresponding reference and output signals whereby the effect of environmental noise is reduced.

5. Apparatus for detecting changes in position of an energy-reflective surface comprising:

means for transmitting sonic sensing signals toward a pathway;

receiving means adjacent said pathway responsive to ones of said sonic sensing signals reflected from the surface of an object on the pathway for generating electrical output signals corresponding to each of said reflected signals;

means for generating a corresponding electrical reference signal having a predetermined time relation with each said transmitted sensing signal and being representative of a reference path of constant length;

means operated in phase with said sensing transmitting means for providing compensating signals at the frequency of the sensing transmitting means that counteract the portion of the output signals of said receiving means caused by incidental reflections of sonic signals along said pathway; and comparing means responsive to said reference and output signals for determining the difference in time of occurrence between said corresponding reference and output signals to indicate the difference in lengths between said reference and reflective paths.

References Cited

UNITED STATES PATENTS

| | | |
|---|---|---|
| 2,640,190 | 5/1953 | Rines. |
| 3,008,332 | 11/1961 | Charbonnier et al. |
| 3,021,481 | 2/1962 | Kalmus et al. _____ 324—83 |
| 3,140,612 | 7/1964 | Houghton et al. _____ 73—398 |
| 3,184,969 | 5/1965 | Bolton _____ 340—1 X |
| 3,237,150 | 2/1966 | Beck et al. _____ 340—1 |
| 3,290,490 | 12/1966 | Auer _____ 235—150.24 |

OTHER REFERENCES

Heydemann, Acustica, vol. 13, No. 6, 1963, pp. 421–426.

RICHARD A. FARLEY, Primary Examiner

U.S. Cl. X.R.

73—67.7